US008456654B2

(12) United States Patent
Kelly et al.

(10) Patent No.: US 8,456,654 B2
(45) Date of Patent: Jun. 4, 2013

(54) PROCESS FOR ELECTRONIC DOCUMENT REDACTION

(75) Inventors: David George Kelly, Wellington (NZ); Brent Russell Foster, Palmerston North (NZ)

(73) Assignee: Onstream Systems Limited, Wellington (NZ)

( * ) Notice: Subject to any disclaimer, the term of this patent is extended or adjusted under 35 U.S.C. 154(b) by 1637 days.

(21) Appl. No.: 11/665,448

(22) PCT Filed: Oct. 14, 2005

(86) PCT No.: PCT/NZ2005/000264
§ 371 (c)(1),
(2), (4) Date: Jun. 12, 2007

(87) PCT Pub. No.: WO2006/041318
PCT Pub. Date: Apr. 20, 2006

(65) Prior Publication Data
US 2008/0204788 A1    Aug. 28, 2008

(30) Foreign Application Priority Data

Oct. 14, 2004    (NZ) ......................................... 535943

(51) Int. Cl.
*G06F 3/12* (2006.01)
(52) U.S. Cl.
USPC .......... 358/1.13; 715/200; 715/223; 715/247; 715/249; 715/256; 358/1.9
(58) Field of Classification Search
USPC .................. 707/104.1, 999 X; 715/513, 500, 715/243; 395/800; 358/1.15, 1.13, 1.9; 380/4
See application file for complete search history.

(56) References Cited

U.S. PATENT DOCUMENTS

| 5,581,682 | A | 12/1996 | Anderson et al. |
| 5,680,636 | A | 10/1997 | Levine et al. |
| 5,903,646 | A | 5/1999 | Rackman |
| 6,525,831 | B1 * | 2/2003 | Evans, IV .................... 358/1.15 |
| 7,428,701 | B1 * | 9/2008 | Gavin et al. ................... 715/247 |
| 2002/0083079 | A1 | 6/2002 | Meier et al. |
| 2002/0118379 | A1 * | 8/2002 | Chakraborty et al. ......... 358/1.9 |
| 2003/0145017 | A1 | 7/2003 | Patton et al. |
| 2003/0152277 | A1 * | 8/2003 | Hall et al. ..................... 382/229 |
| 2004/0036924 | A1 * | 2/2004 | Ihara ............................ 358/3.28 |
| 2004/0088313 | A1 * | 5/2004 | Torres .......................... 707/101 |
| 2004/0205580 | A1 * | 10/2004 | De Angelis et al. .......... 715/513 |
| 2004/0268220 | A1 * | 12/2004 | Venkatesan et al. .......... 715/500 |
| 2006/0026502 | A1 * | 2/2006 | Dutta ............................ 715/511 |
| 2007/0050696 | A1 * | 3/2007 | Piersol et al. ................. 715/500 |

OTHER PUBLICATIONS

Poulsen, "Justice e-censorship gaffe sparks controversy", SecurityFocus (online), Oct. 22, 2003, XP002499046, retrieved from the Internet, 2 pages.

* cited by examiner

*Primary Examiner* — Benny Q Tieu
*Assistant Examiner* — Juan M Guillermety
(74) *Attorney, Agent, or Firm* — Young & Thompson

(57) ABSTRACT

A redaction process (10) to enable a user to redact an electronic document on a computer. The redaction process (10) includes the steps of converting a copy of the original electronic document file (14) from its native format into the format of an electronic image file. The user may redact sections of the electronic image file, and save the redacted electronic image file in electronic file format.

24 Claims, 16 Drawing Sheets

FIG. 11

PROCESS FOR ELECTRONIC DOCUMENT REDACTION

BACKGROUND TO THE INVENTION

This invention relates to a process for electronic document redaction.

Businesses around the world are having to cope with the increasingly regulated business world, particularly in regard to their responsibilities and accountability to their Board of Directors, shareholders, and customers.

These new regulations, which promote an increasing transparency of the business processes and activities, require businesses to release for public scrutiny, documents that may contain information that is commercially sensitive, or information that is confidential to the business.

Business transparency ensures that there is accountability in the decision making process, to remove, or reduce the possibility of one or more persons making business decisions for their own gain at the expense of the organisation.

Government departments, governmental agencies, and the public sector in general desire, or are required to release documents that may contain sensitive or confidential information, for public scrutiny. In order for these documents to be released, particular information must be removed so that, for example, parties named in the document are not disadvantaged by the release of the document, and the information contained within. Some of the types of information that may require redaction are names of children or family members, financial accounting information, etc.

Document compliance is a requirement of best business practice, for example, the Sarbanes Oxley in the United States, and various other acts for example, the Freedom of Information and Privacy Acts that are in force in designated territories. Compliance is also required for international record keeping standards from the United States such as the Department of Defence 5015.2, United kingdom's Public Records Office 2002, and European Moreq.

In order to comply with the aforesaid business regulations and best business practice, documents that are required to be redacted must be done so according to the legal, processing, and reporting requirements, as required by the aforesaid standards. In some instances, where information is to be redacted from a document, markings are to applied to the document where information is removed.

There are known methods by which to redact documents. One method is by using a paper based method, where the paper document is reproduced, redacted, then reproduced again for distribution. Any information below the redaction marking of the distribution copy will not be recoverable within this document. This method may be acceptable in a small organisation where there is a relatively small amount of documentation to be redacted, however in a large organisation, where most documents are now held as computer files, a computer based method is required for business processes, ease of use and storage of the large numbers of documents used.

There are computer applications available for office use, on which documents are created and edited. An example of such applications are Microsoft Word and Adobe Acrobat. These applications also provide the facility for a user to redact documents, however, where Adobe Acrobat is used, a third party plugin must be used in order to redact a document in PDF format. However, the correct computer applications and methods must be used to securely redact documents.

Electronic documents created with the aforementioned types of application contain hidden data known as metadata, consisting of revision history and other data, within the file of the electronic document. Thus, where a document has been redacted, the redacted information may still be contained within the electronic file. The skilled addressee will therefore be able to recover text within the document that was previously changed or deleted. Therefore, redaction of documents with standard office computing tools is an unsecure method, and cannot be relied upon to remove all of the redacted information from the document, as in some cases a copy of the redacted electronic document itself may be publicly released.

Other known methods of document redaction are scanning the paper document, and thereby converting this document into an image file. In order to redact this image file, the user must use graphic manipulation software such as Adobe Photoshop. However, this method is relatively slow, and the user must have access to the specialised graphic manipulation software which is not only complex to use, but expensive to purchase. The user must also be proficient in it use in order to achieve the desired result.

Traditional redaction processes have a number of disadvantages. One disadvantage is that traditional electronic redaction processes merely make invisible, on the face of the document, the text that has been redacted. Although the text is removed from view, it may still reside within the documents electronic file as hidden data.

Another disadvantage is that redacted data residing within a documents electronic file can be easily recovered by the skilled addressee.

A further disadvantage is that redaction using paper based methods is slow, inconvenient for large organisations, and poses storage problems for the large numbers of files held.

Yet another disadvantage is that where large organisations must redact many documents, the documents to be redacted may not be held in a central repository at any particular branch of the organisation. Therefore, it may prove to be very difficult for one or a small number of users in one location to redact these documents.

SUMMARY OF THE INVENTION

It is therefore an object of the present invention to provide a process for the redaction of electronic computer documents that completely removes from the documents electronic file, all traces of the redacted text etc, or at least a process for redaction which provides the public with a useful choice.

Broadly according to one aspect of the invention there is provided a redaction process to enable a user to redact an electronic document on a computer, said process including converting a copy of the original electronic document file from its native format into the format of an electronic image file, redacting sections of the electronic image file, and saving the redacted electronic image file in electronic file format.

According to another broad aspect of the invention there is provided a computer programmed to enable a user to redact an electronic document including means to convert a copy of the original electronic document file from its native format into the format of an electronic image file, means by which to redact the electronic image file, and means to save the electronic image file in electronic file format.

Preferably the applications to be used with the redaction process of the invention are based on, and compatible with, the Microsoft Windows computer operating system.

In the following more detailed description of the invention according to preferred embodiments, reference will be made to the accompanying drawings in which:—

BRIEF DESCRIPTION OF THE DRAWINGS

FIG. 11 is a screen shot of the converted original document that has been automatically redacted.

DESCRIPTION OF PREFERRED EMBODIMENTS OF THE INVENTION

According to one embodiment of the invention there is provided a redaction process for the removal of sensitive information within an electronic computer document, such that when the computer document has been redacted, the redacted information is completely removed from the file, and thus be unrecoverable from the electronic file.

This process can be likened to the electronic version of a paper based redacting process, whereby the page is copied, redacted, and copied again, with this final copy being publicly released. Thus no trace of the redacted information can be found within the redacted copy.

It will be apparent to the skilled addressee that there are many different types and versions of computer operating systems in use by both the personal user and the corporate environment, and it will be apparent to the skilled addressee that computer software may be written and compiled for use on different computer operating systems. The Microsoft Windows operating system is described as being used.

Figure 1:
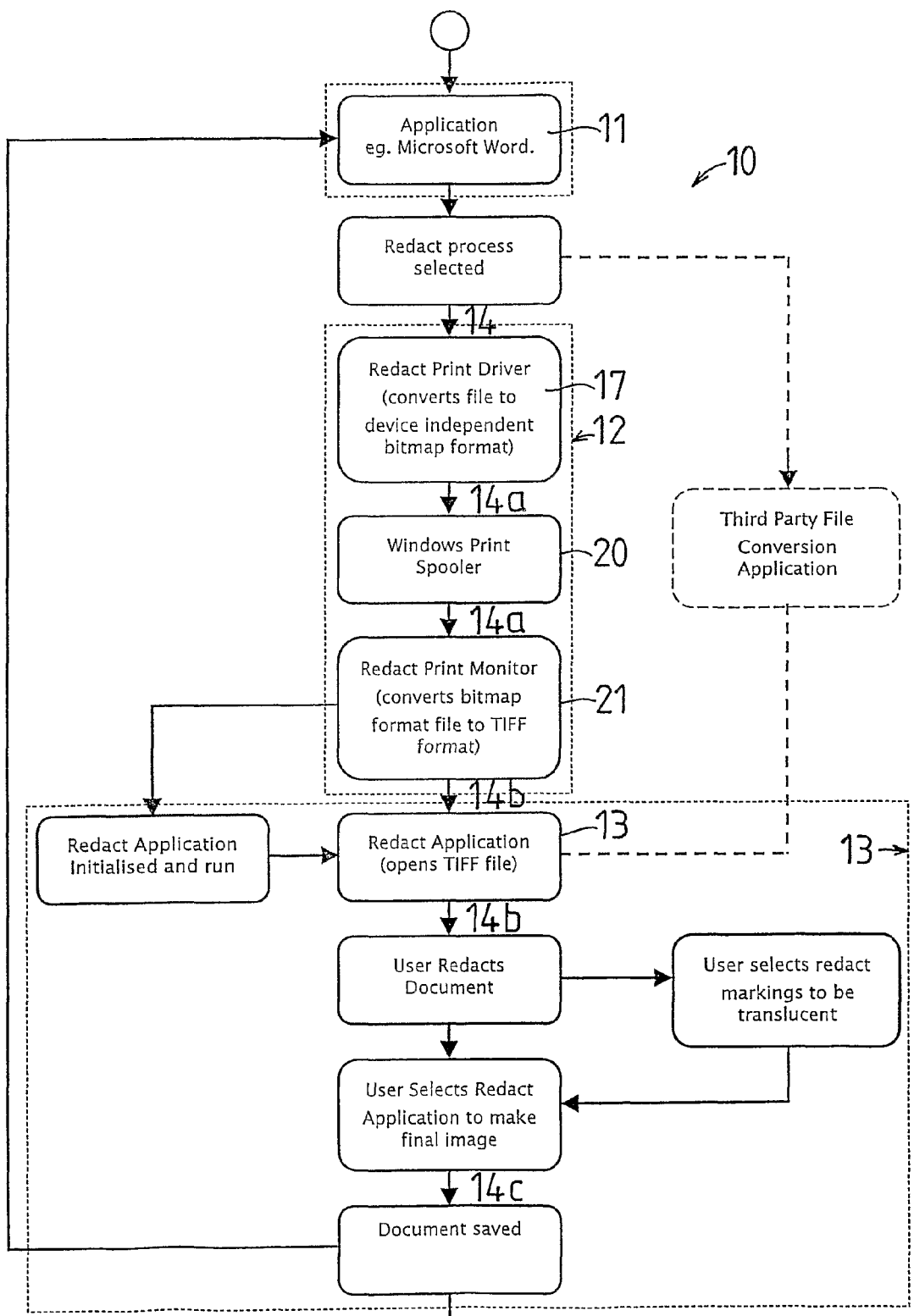
FIG. 1 is a schematic diagram of a computer system incorporating the invention.
Figure 2:
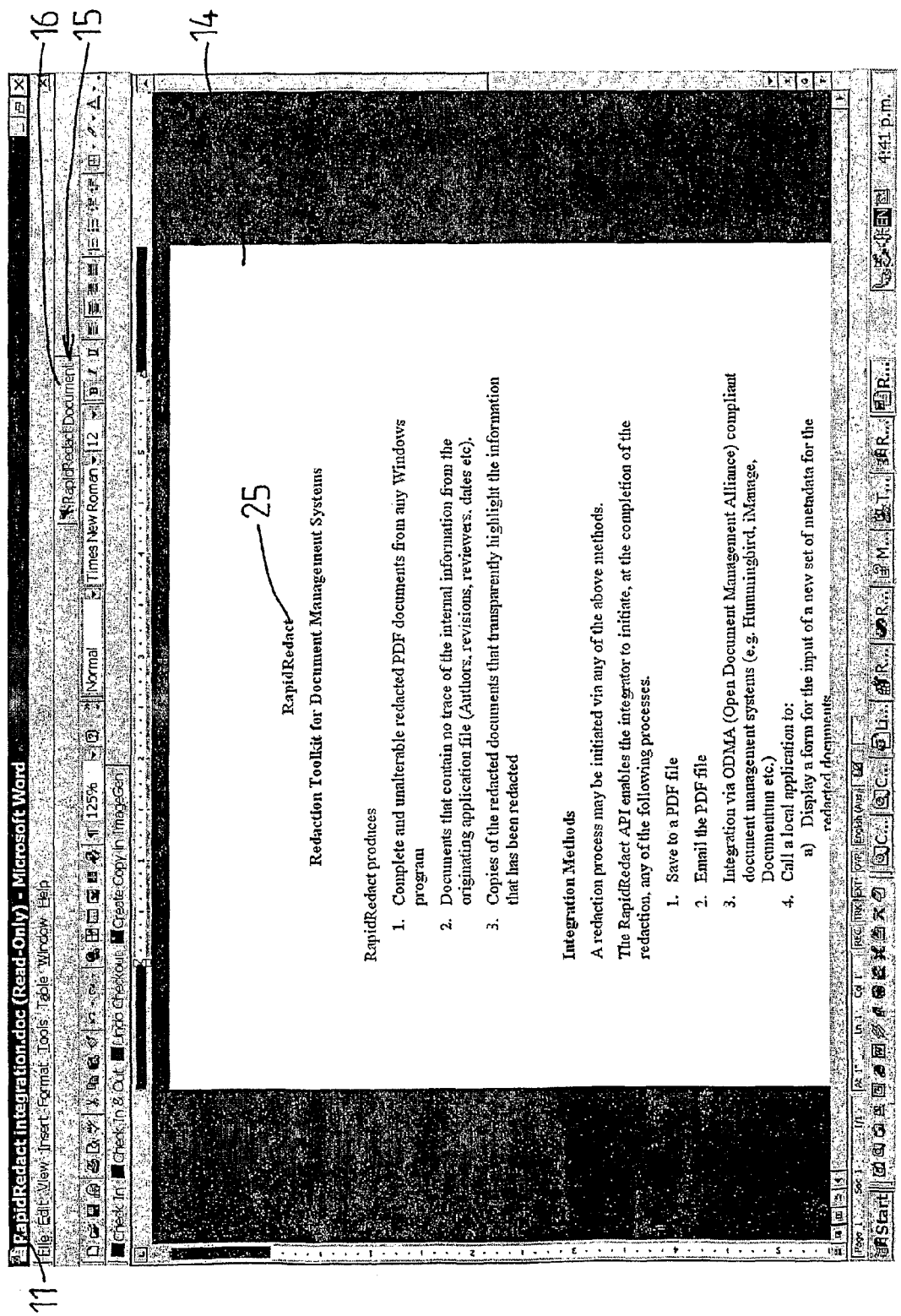
FIG. 2 is a screen shot of the application software of FIG. 1 with original document open.
Figure 3:
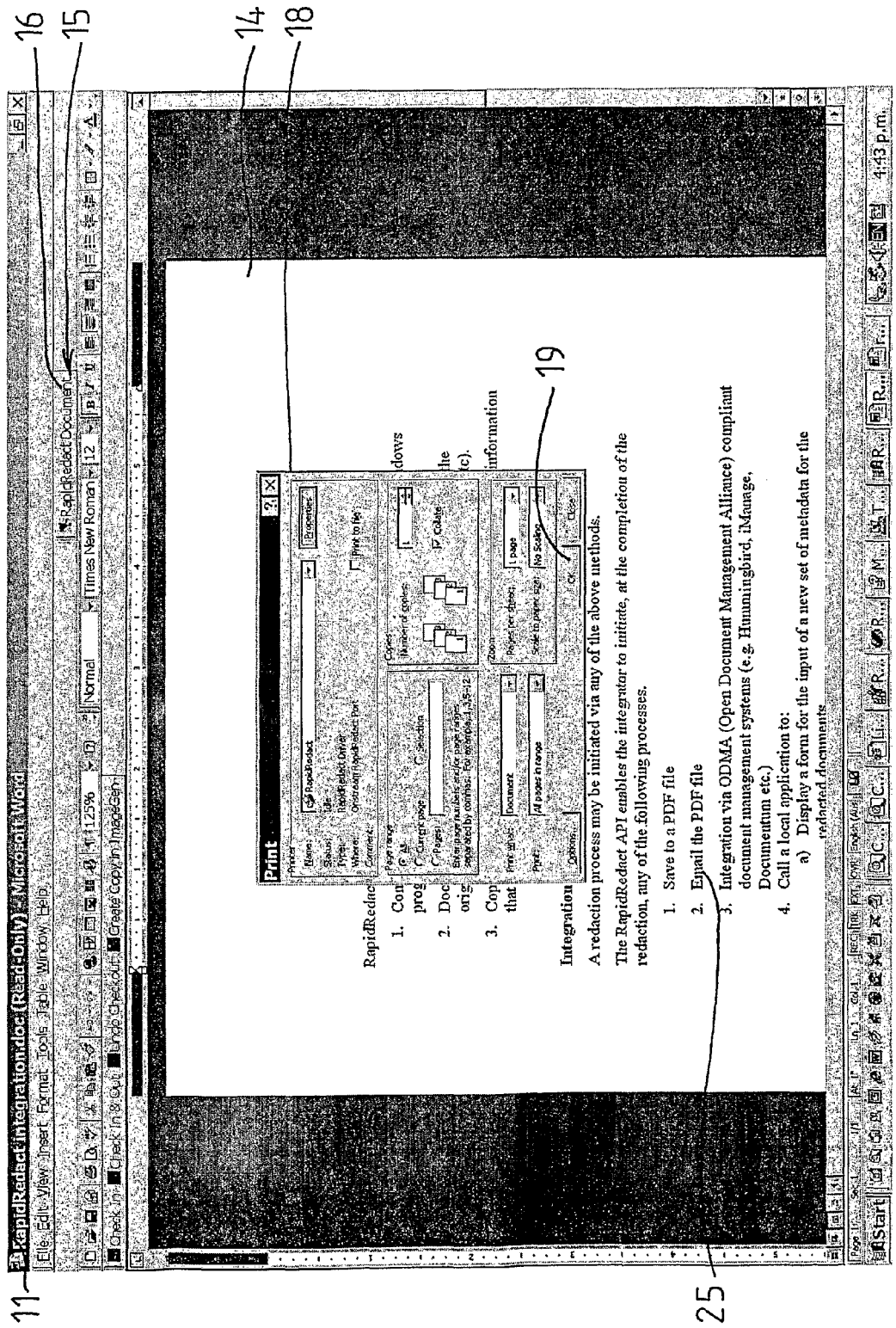
FIG. 3 is a screen shot of the application software of FIG. 1 printing the application file.
Figure 4:
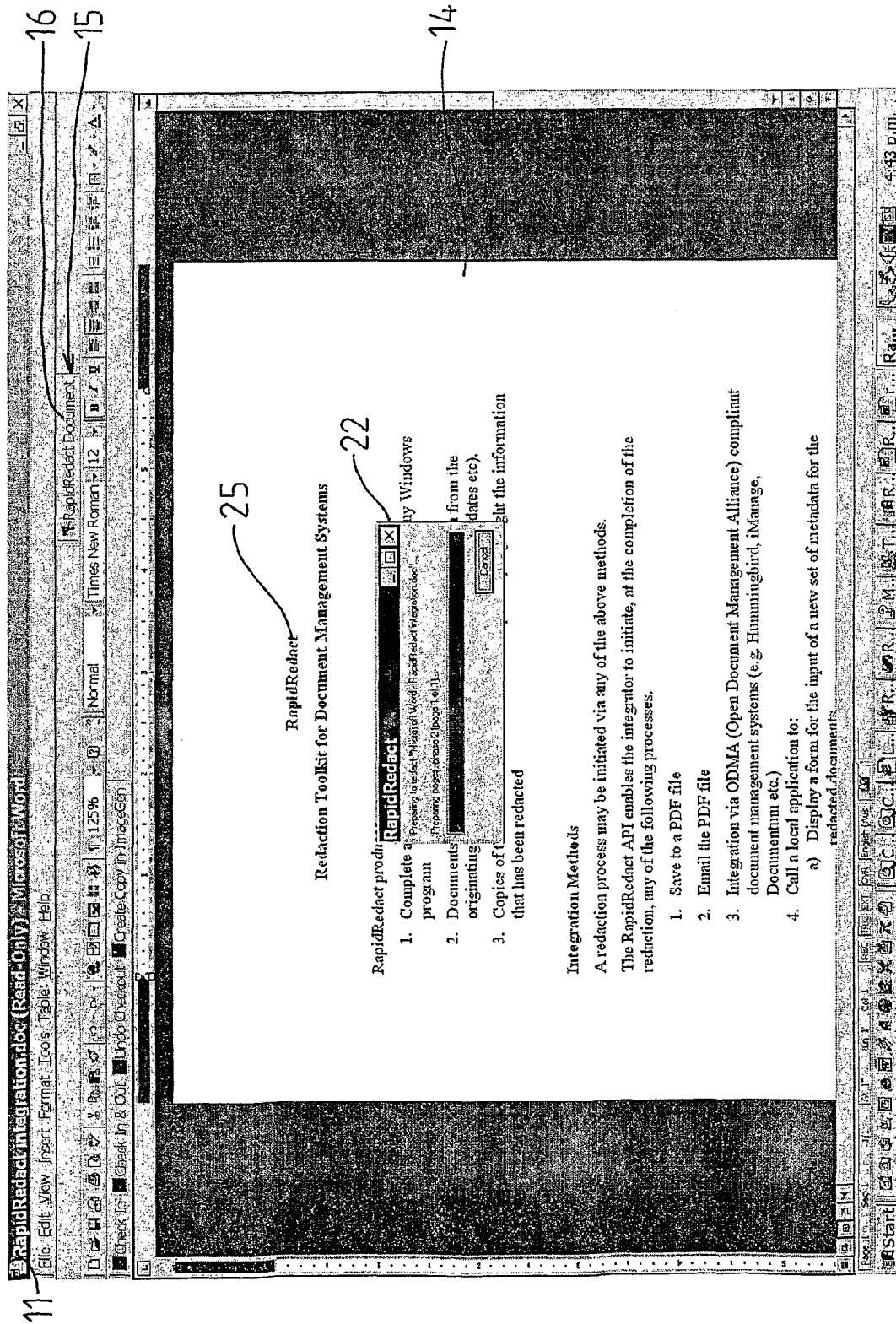
FIG. 4 is a screen shot of the application software of FIG. 1 during the process of converting the original file into a format for use by the redaction software of FIG. 1.
Figure 5:
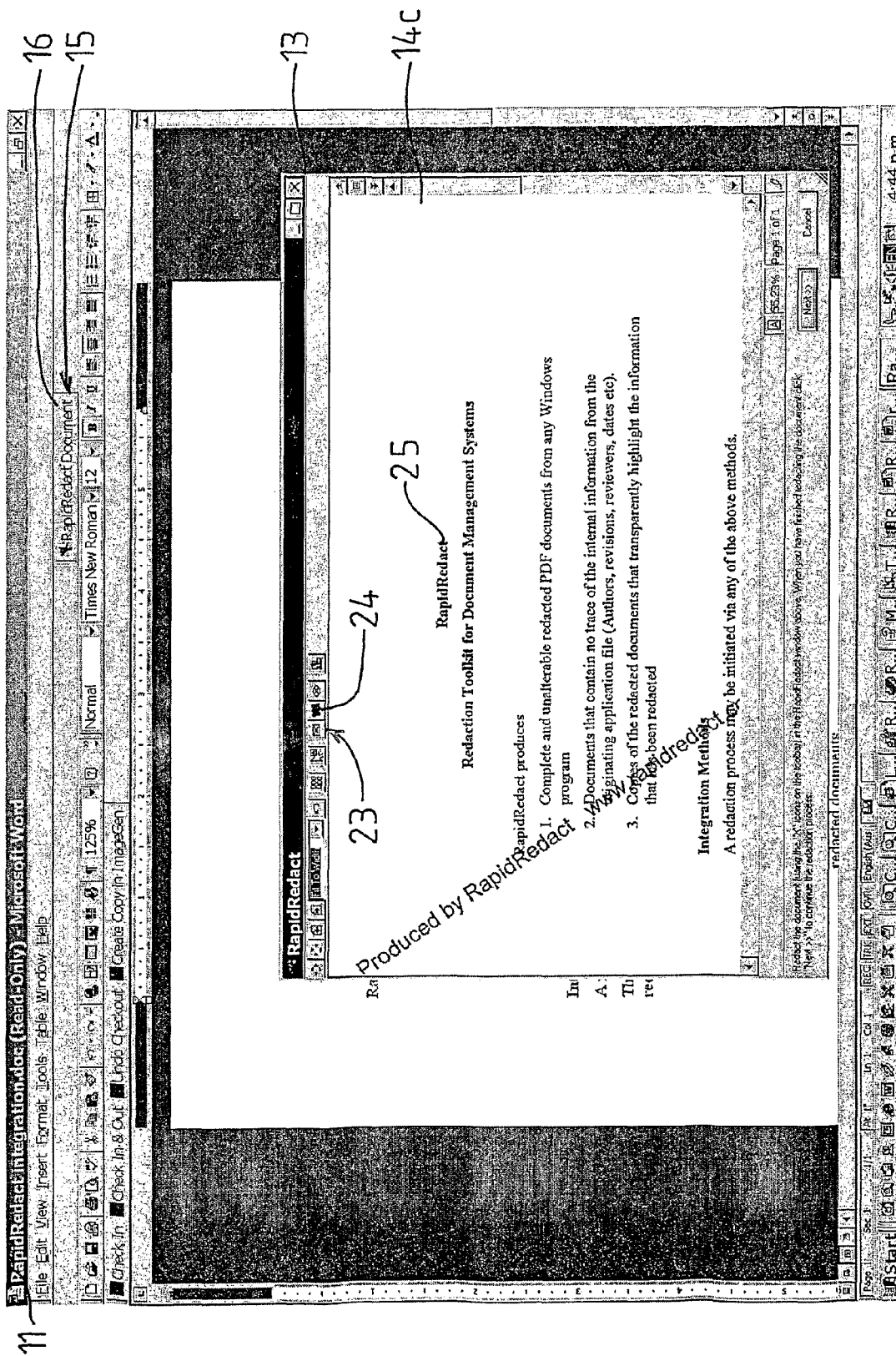
FIG. 5 is a screen shot of the converted original document opened by the redact software of FIG. 1

As installed onto a computer, the components that interact with each other thereby allowing the redaction process 10 to be accomplished, according to a preferred embodiment, is illustrated in FIG. 1.

The process contains at least three components or subsections as illustrated in FIG. 1. These are the application software 11 from which the user may create and edit an electronic document, a method for converting the original document file to an image by, for example, the operating systems printing functionality 12 which enables the system to convert the original document to an image document, and the redaction software 13, in which, the redaction process is undertaken, and in which the image file is saved.

It will be apparent to the skilled addressee that there are many different types and kinds of application software available, and that each application produces electronic documents with file types specific to that application. For example a Microsoft Word document is of the type MyDocument.doc, and an AutoCAD drawing file is of the type MyDocument.dwg—the file types of each application are not compatible with each other.

The application software 11 that a person uses to create and edit an electronic document can be of any type and kind that is compatible with the Microsoft Windows computer operating system. Typically, a person will open the desired software application 11, create an electronic document, and save this document on their respective computers hard drive or data storage device for later viewing or editing.

It will be apparent to the skilled addressee that the Microsoft Windows computer operating system has inbuilt printing functionality. Therefore, the methods by which the operating system handles printing jobs will not be described in detail.

It will be apparent to the skilled addressee that the redaction application software will be loaded onto a local computer for redacting documents located on that computer, or over the local area network to which the computer is networked. In another form of the invention, third party webstreaming software may be integrated with the redaction application software, thereby enabling the user of a local machine to efficiently redact documents located on a remote computer, via the internet.

In one form of the invention, the redaction application software 13 will typically be loaded onto a users individual computer, and at the time of installation, the redaction software 13 will search for and detect the most commonly used Microsoft Windows compatible applications installed on the host computer. Commonly used application may be Microsoft Office Products such as Word, Excel, PowerPoint, Access and email documents. The redaction software will thus be available for use in conjunction with any of these Microsoft Windows compatible applications.

The redaction application will enable toolbars to be integrated into the user interfaces of the aforementioned applications. Where the aforementioned applications interfaces do not support toolbars, then the functionality can be accessed through the print functionality, as will be described later in the specification.

In one embodiment, the redaction application will be available for use through a shortcut to the application being placed on a pop up menu, as accessed by right clicking a file within Windows Explorer.

There are a number of different methods by which to start the redaction application, described below is but one method.

In use, the user will open the application 11 in which the document they would like to redact has been created, for example Microsoft Word, and open the respective electronic document 14.

Once the application 11 opens, within the user interface of the application 11, and visible on the computer screen, a toolbar 15 will be visible for the activation of the redaction application 13. Once the electronic document 14 the user wishes to redact is open, the user selects the redact document button 16 on the toolbar 15.

It will be apparent to the skilled addressee that the printing functionality provided to the redact software, and denoted by numeral 12, can be achieved by standard Windows programming techniques, using the inbuilt printing functionality provided by the Windows computer operating system.

It will be apparent to the skilled addressee that there are known methods by which to convert an electronic file in a particular format, to one of a different format. Illustrated below is but one such method.

The redact printer driver 17 operates in the same way as a conventional Windows printer driver within the operating system. However, the print output file is not sent to an external printer, but through the windows printing functionality 12, and to the redaction application 13.

By the use of a dedicated Windows print driver to generate an image of the original document, an image of any document created by a Windows compatible application can be created, irrespective of each application's native file type.

The redact printer driver 17 is called, by the activation of the "RaqpidRedact document" button 16, and run. A print dialogue box 18 is displayed on the users computer screen.

Print dialogue box 18 is a standard Windows component. It also provides the user the option to custom configure print settings as desired. When the user is ready to print, the ok button 19 is selected.

The redact print driver 17 converts the original document 14 into a device independent bitmap 14*a*, which is then passed to the Windows print spooler 20. The spooler 20 passes the file 14*a* to the redact print monitor 21.

The redact print monitor 21 converts the device independent bitmap file 14*a* into, preferably a TIFF (tagged image file) format, as this is a popular and flexible public domain raster file format, and outputs this TIFF format file 14*b* to the redaction application. The electronic file 14*b* produced at this stage of the process is merely a "picture" of the original document, and can be likened to the photocopy of a paper page.

Concurrent with the above operation, a dialogue box 22 containing a progress bar is displayed on the users computer screen. This indicates to the user that the system is processing the request, and the document 14*b* is being prepared for the use by the redact application 13. As is standard programming practice, within dialogue box 22, a button is provided to enable the user to cancel the process as desired.

As the aforementioned "printing" process 12 is running, the redact print driver 17 sends a call to the redaction application 13. This call initialises and runs the redaction application 13 once the file, in TIFF format, is released from the print monitor 21. The redact application 13 user interface opens in a new viewing window on the users computer screen, and the picture of the original document 14*b* which has been created by the printing process 12, is opened by the redact application 13 in this window.

On the redact application 13 user interface is a toolbar 23, on which is found the applications function buttons. Upon selecting button 24, a pull down menu (not shown in the drawings) is displayed on the screen. From this pull down menu the user can select the desired pen type/width or shape that will be used to redact the text 25 within the image 14*c*. For example, a circle or elliptic shape can be selected, or a narrow or wide line can be drawn over the text 25 etc to be redacted.

Figure 6:
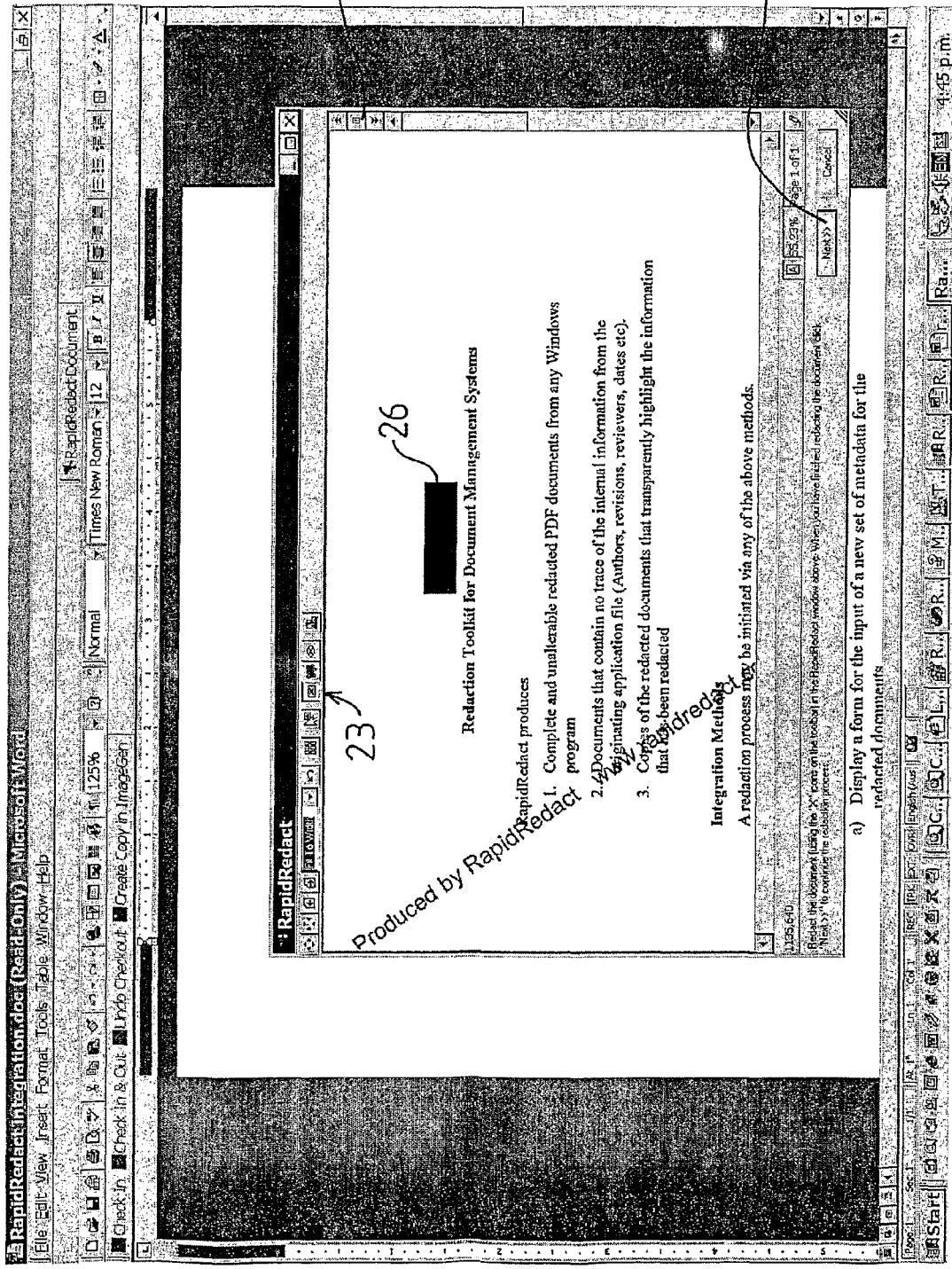
FIG. 6 is a screen shot of the redacted original document.
Figure 7:
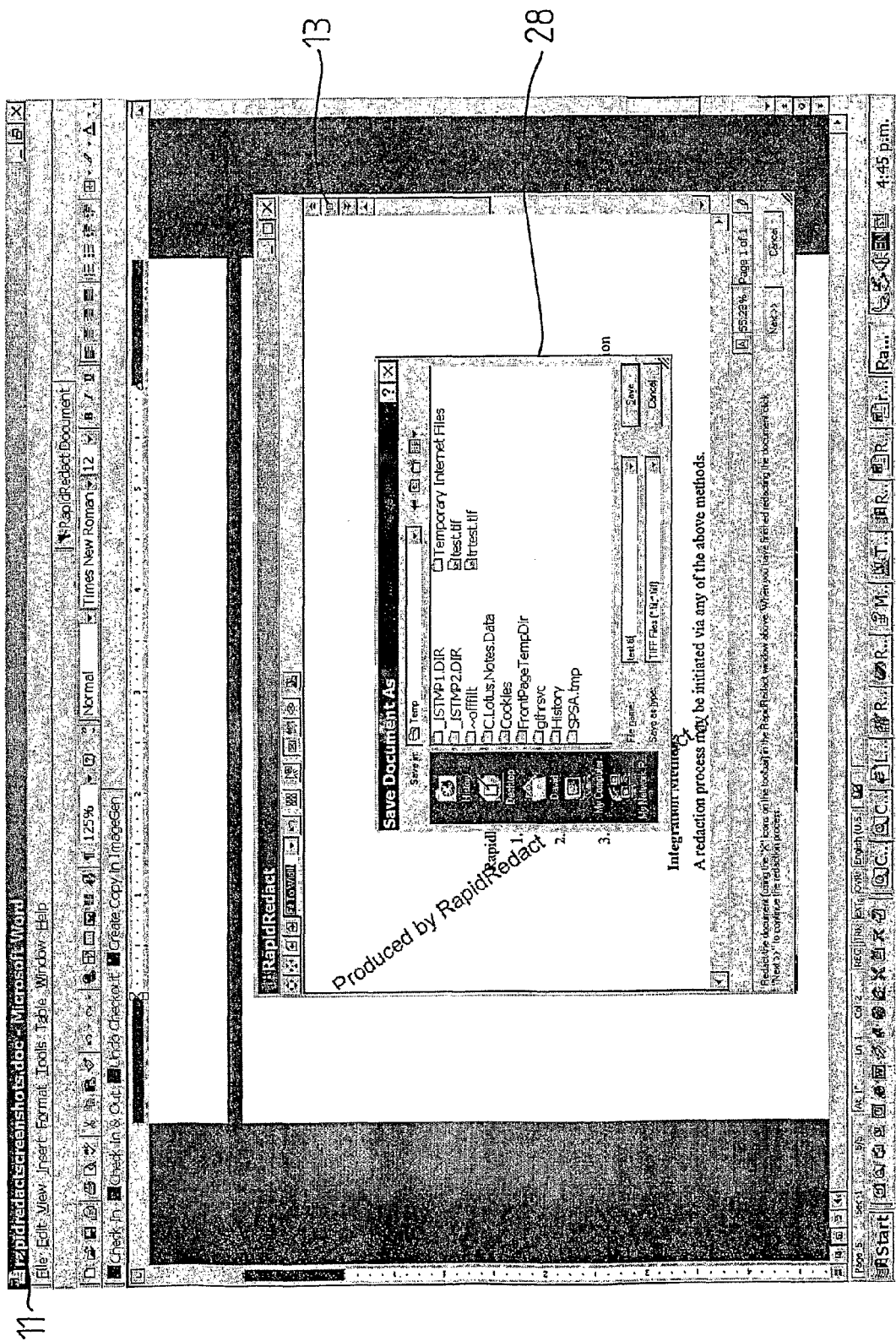
FIG. 7 is a screen shot of the redaction software's user prompt to save the redacted file.

After the user selects the pen style in which to redact with, the user highlights the sensitive sections of text with their pointing device, for example, a computer mouse or electronic pen. The redacted text is covered, in one embodiment, preferably by a one hundred percent (100%) solid black mark 26, as is illustrated in FIG. 6.

At the positions marked on the image by the user, the pixel values corresponding to the redact markings are changed in value from those representing text etc within the image, to values representing a single shade, which can be, for example, solid black.

At any point in the redact process, where a redact marking is incorrectly placed, this marking may be moved or removed by the user, provided that the user has not saved the image.

Once the user has, in the manner described, successfully redacted the text 25 etc on the selected page, and is confident there is no visible sensitive data remaining within the image, the user selects the "next" button 27 with their pointing device.

Upon activation of this button 27, the redaction application 13 makes final the image, and prompts the user to save a copy of this final image onto the storage device within their computer, by the display of a Windows save dialogue box 28.

To make the redacted changes to the image permanent the redaction application 13 saves the value of each pixel which makes up the image. Each pixel is assigned a value, the value of which relates to a visible colour. Therefore, at areas in the document 14*c* where there are redaction markings 26, the pixels in the image relating to these sections have their values changed from those representing the text and background colour, to a single value representing the redact mark 26.

By this process, the value of each pixel in the image is saved, thus, all trace of the pixel values in the original image, corresponding to that text which was redacted, are overwritten with a new value, thereby leaving no trace within the image of the previous pixel values.

Once the redacted image has been saved according to the above description, there is no possibility of further adding or deleting redaction markings to this saved redacted image. In the event the user has made any error in redacting the document, the process must be restarted from the beginning.

The document 14*c* remains open through the aforementioned process of saving a copy of the redacted image. Thus the user may desire to create a further copy of the redacted image with the solid redact markings 26 shown translucent, for the purposes of retaining on file.

Figure 8:
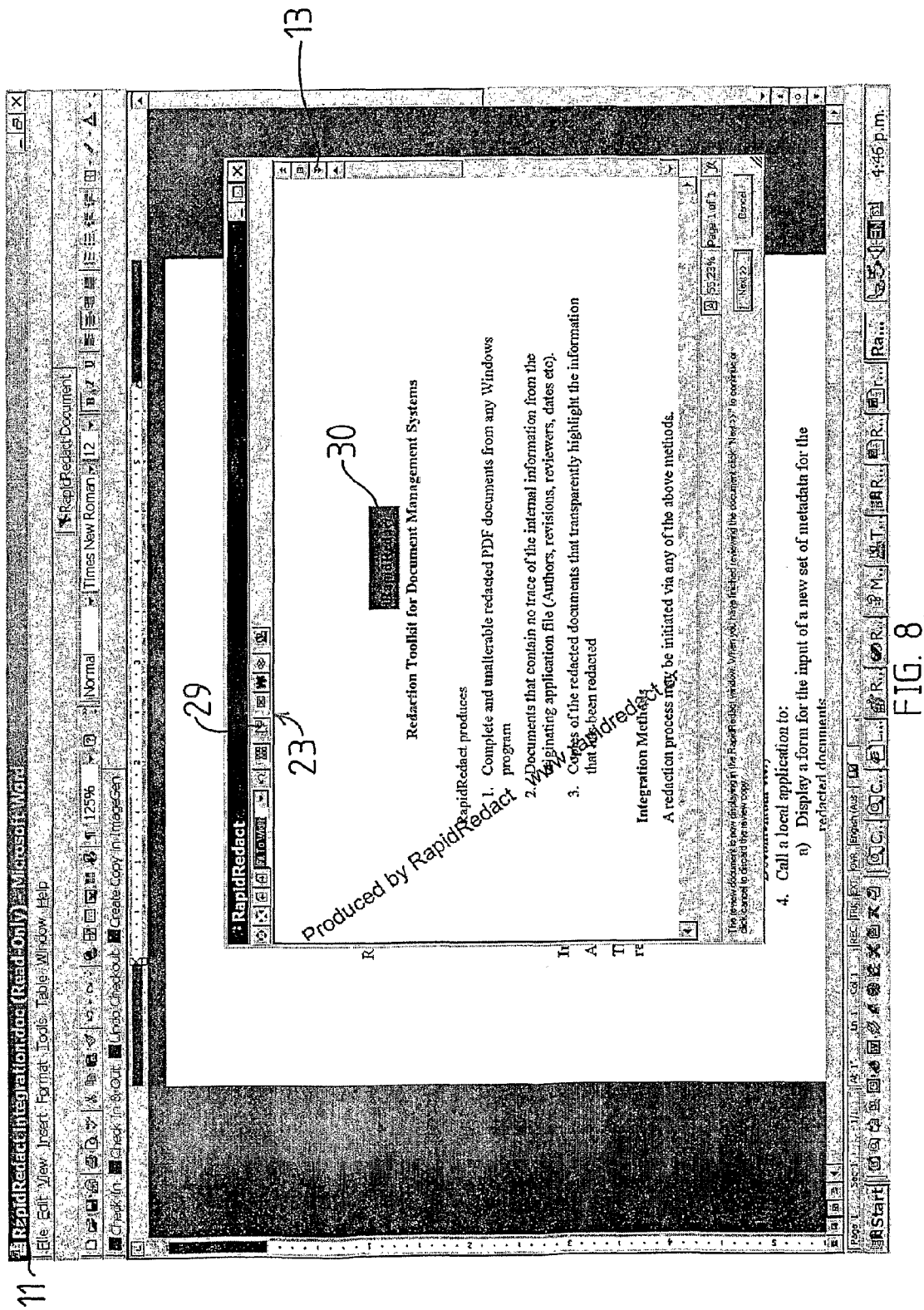
FIG. 8 is a screen shot of the redaction software illustrating translucent redaction markings.
Figure 9:
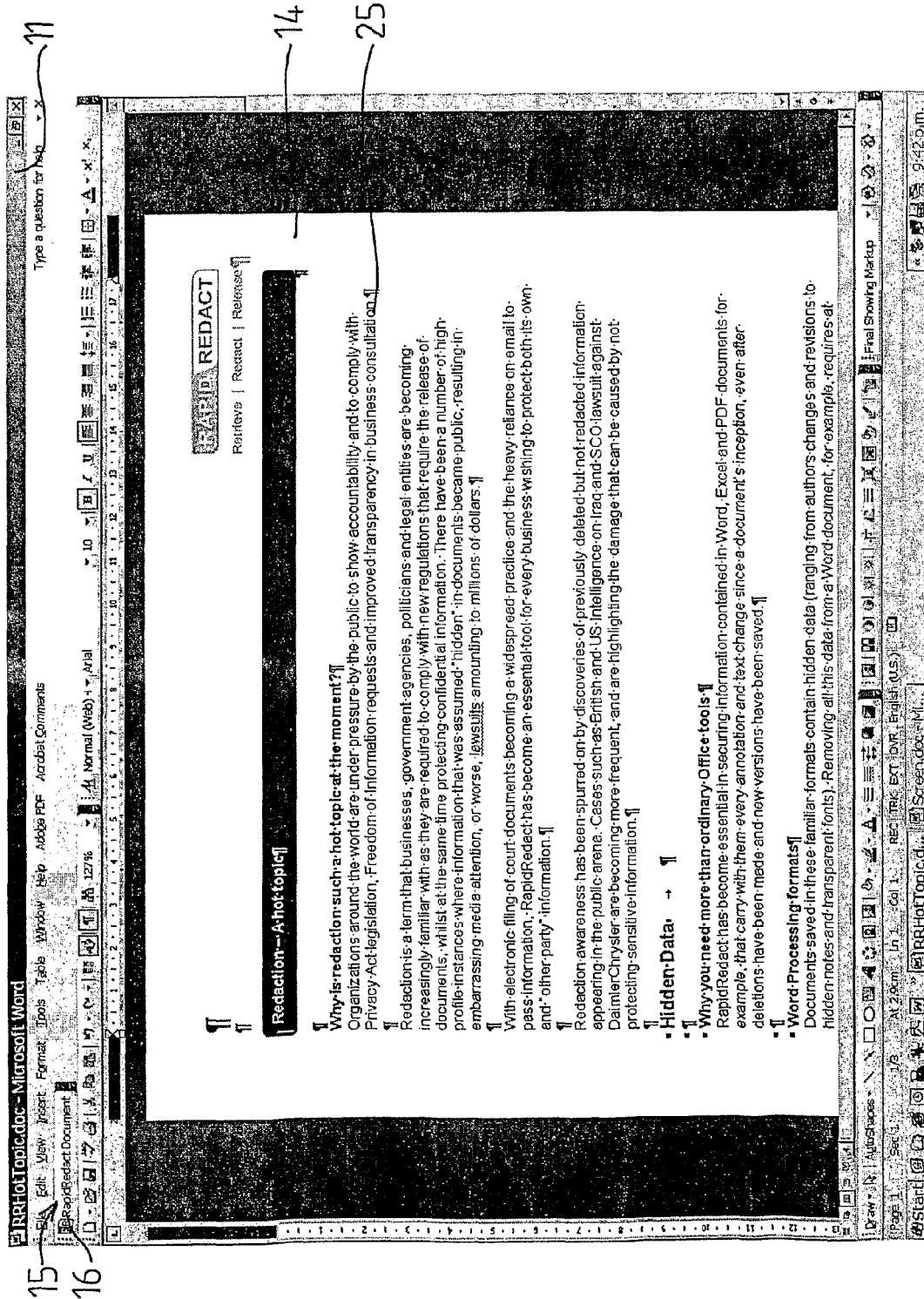
FIG. 9 is a screen shot of the application software of FIG. 1 with original document open.

Once an electronic document has been redacted, there is, according to some standards, the requirement for the organisation etc to keep a copy of the redacted document. The redaction software has the facility, by the user selecting button 29 with their pointing device, to display the solid redact markings 26 as translucent markings 30, as is illustrated in FIG. 8. This allows a person/persons within the organisation to view the entire document, and being able to view the text/drawings etc that have been redacted.

Preferably the translucent shade will be a shade that is the same colour as the solid redact markings, and could, for example, be, say, fifteen percent (15%) solid. In this manner, the marking will take on the appearance of a translucent shade.

In order for the solid redact markings 26 to be illustrated as translucent, the redaction software 13 detects within the image the positions of all the user applied redact markings 26. At these positions, the application 13 executes a routine within its software to change the shade of the solid redact markings 26, from, for example one hundred percent (100%) solid black, to a fifteen percent (15%) solid, which takes on the appearance of a shade of grey. This translucent shade allows for the black text to appear to be visible through the translucent mark 30, as displayed on the users computer screen, and illustrated in FIG. 8.

In order for the redacted text etc 25 to appear to be visible through the translucent marking 30, the software must take steps to place the translucent marking 30 behind the text 25. Thus, the text 25 will appear to be visible through the translucent marking. Effectively, it will appear as if the background of the text 25, at positions corresponding to the redact markings 30, will be changed.

To make the image permanent and to save the document, the user undertakes the same process to save the document as that described above.

In another form of the invention, the redaction process and its method of operation is as described above. However, in this embodiment of the invention, there is functionality which thereby allows a user to automatically redact an electronic document upon activation of the redaction process 10. Key search words to be redacted are pre-programmed into the redaction application software, and these words are initially redacted from the electronic document, as will be apparent in the following description.

In use, a person opens the application software 11 in which the document they would like to redact has been created, for example, Microsoft Word, and opens the respective electronic document 14, as illustrated in FIG. 1.

As described above, within the user interface of the application 11 and visible on the computer screen, a toolbar 15 will be visible for the activation of the redaction application 13. The person selects the redact document button 16 on the toolbar 15.

The redact print driver 17, windows print spooler 20, and redact print monitor 21 within print subsection 12, are subsequently called, and run, to create a TIFF image of the electronic document. The method by which this is performed is described above.

Included within the print subsection 12 is functionality that extracts text and its associated location data from the original document 14. this may be performed by any known means.

It will be apparent to the skilled addressee that there are many methods by which text and its associated location data may be incorporated in the TIFF image file. The method of embedding this data within the TIFF image file is described herein and with reference to the accompanying drawings.

The text and its location data is subsequently embedded within the TIFF image created from the electronic document 14.

Figure 10:
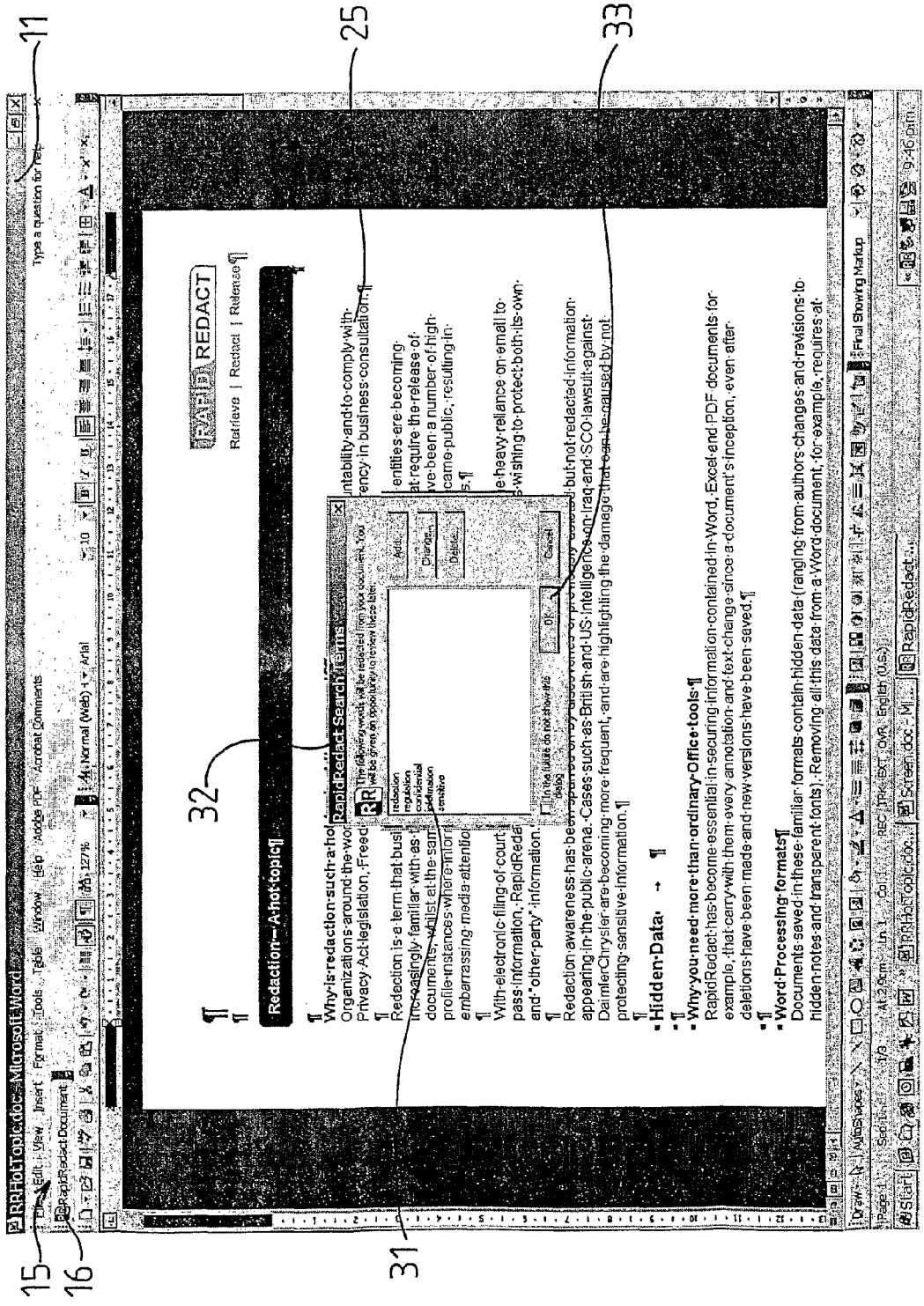
FIG. 10 is a screen shot of the application software of FIG. 1 which confirms the search terms to be used to automatically redact the document.

Once the location data has been embedded in the TIFF file 14e as previously described, a pop up dialog box 32 titled RapidRedact Search Terms 32 is displayed on the persons computer screen, as illustrated in FIG. 10.

This dialog box 32 may contain typical search terms 31 that a person may commonly redact from electronic documents. This feature thereby saves the user time in that the search terms 31 may be automatically redacted from the electronic document, as will be described hereinafter.

The person has the opportunity to add or delete search terms 31. The person subsequently presses the OK button 33 to proceed with redaction of the TIFF file 14e as illustrated in FIG. 10.

Upon pressing the OK button 33, the redact software 13, by use of the text and text location data located within the TIFF file 14f, will locate all of the search terms 31 entered by the user within the TIFF file 14f.

All search terms located within the TIFF file 14f will be redacted by the redaction software 13, thus resulting in a rectangular and translucent shade of grey 30 covering the space occupied by the search terms 31.

The redaction application 13 executes a software routine that ensures that the search term 31 is visible through the translucent redaction marking 30. In this way, the redact software 13 places the translucent redact marking 30 behind the text 25, effectively marking it appear as if the text 25 is visible through the redaction marking 30.

Figure 11:
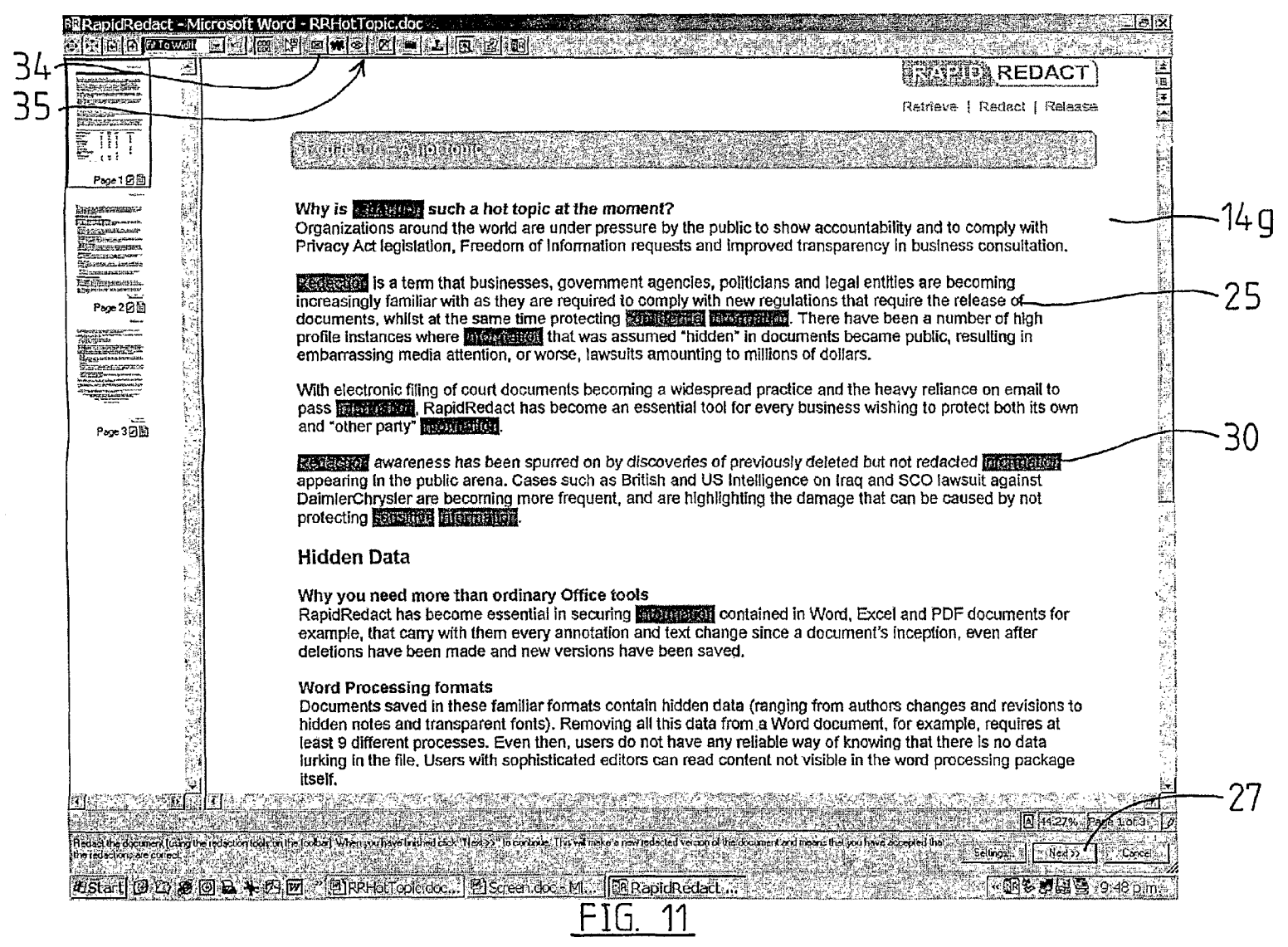

Once this information has been removed, the TIFF document is opened in the redact software application interface, as illustrated in FIG. 11.

At this time, a user may select the rectangle redaction tool 34 from the toolbar 35, and further redact the TIFF file 14g as desired.

Each redaction marking applied by the rectangle redaction tool 34 is applied as a translucent marking 30. The method of marking the text visible through the translucent marking 30 has been described above.

Once the person has completed redaction of the TIFF file 14g, the redacted document 14g may be saved as a final document 14c, as illustrated in FIG. 1. In the final document 14c, all of the translucent redaction markings 30 are shown as solid black 26.

During the stage of making final the document, ie saving the document in final form as a PDF document, the redaction software 13 will execute a routine that searches and locates all of the text and location data embedded within the document. The text and location data corresponding to the redacted text within the document will be removed from the final document, and will thus not be recoverable.

The remaining text and location data embedded within the final file may be considered to be non-sensitive. Therefore, the remaining text and location data may be removed from the final document.

Preferably, the non sensitive text and location data embedded within the final document will remain within the document. This results in the final PDF document containing non sensitive text that is searchable. As described above, redacted text will not be searchable, as all reference to redacted text has, as described above, been removed from the document.

An alternative to creating a final document is to create a review file. A review file allows the person to further redact the document at a later time, or remove translucent redaction markings 30 from the document.

A review file is particularly useful for management to review the redaction process, before the documents are saved as final redacted documents.

Figure 12:
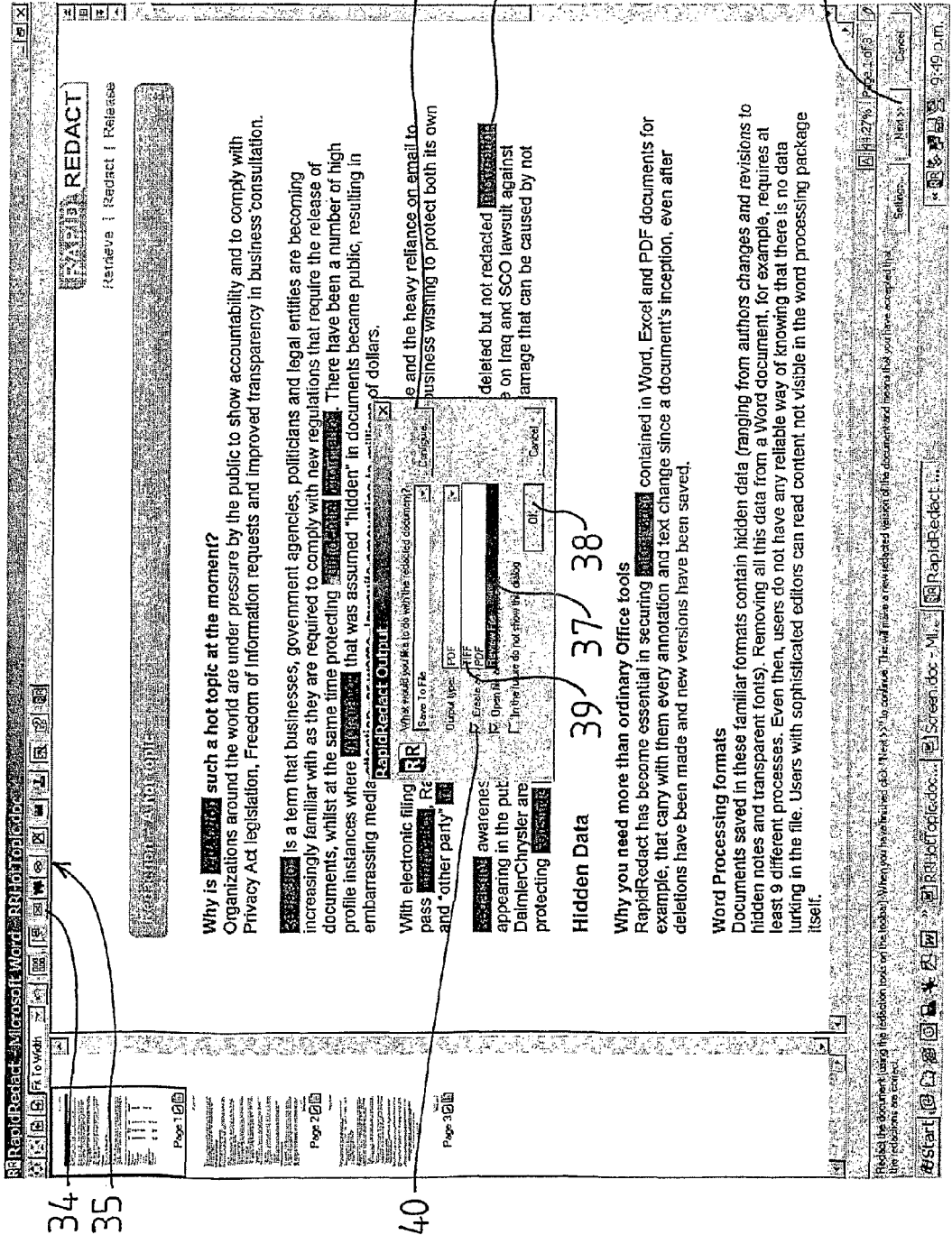
FIG. 12 is a screen shot of the converted original document during the process of saving a review or final copy of the document.

To create a review file 14h from the redacted document, the next button 27 on the user interface is selected. An output type dialog box 36 is displayed. The review file option 37 is chosen, and the ok button 38 selected. This is illustrated in FIG. 12.

Figure 13:
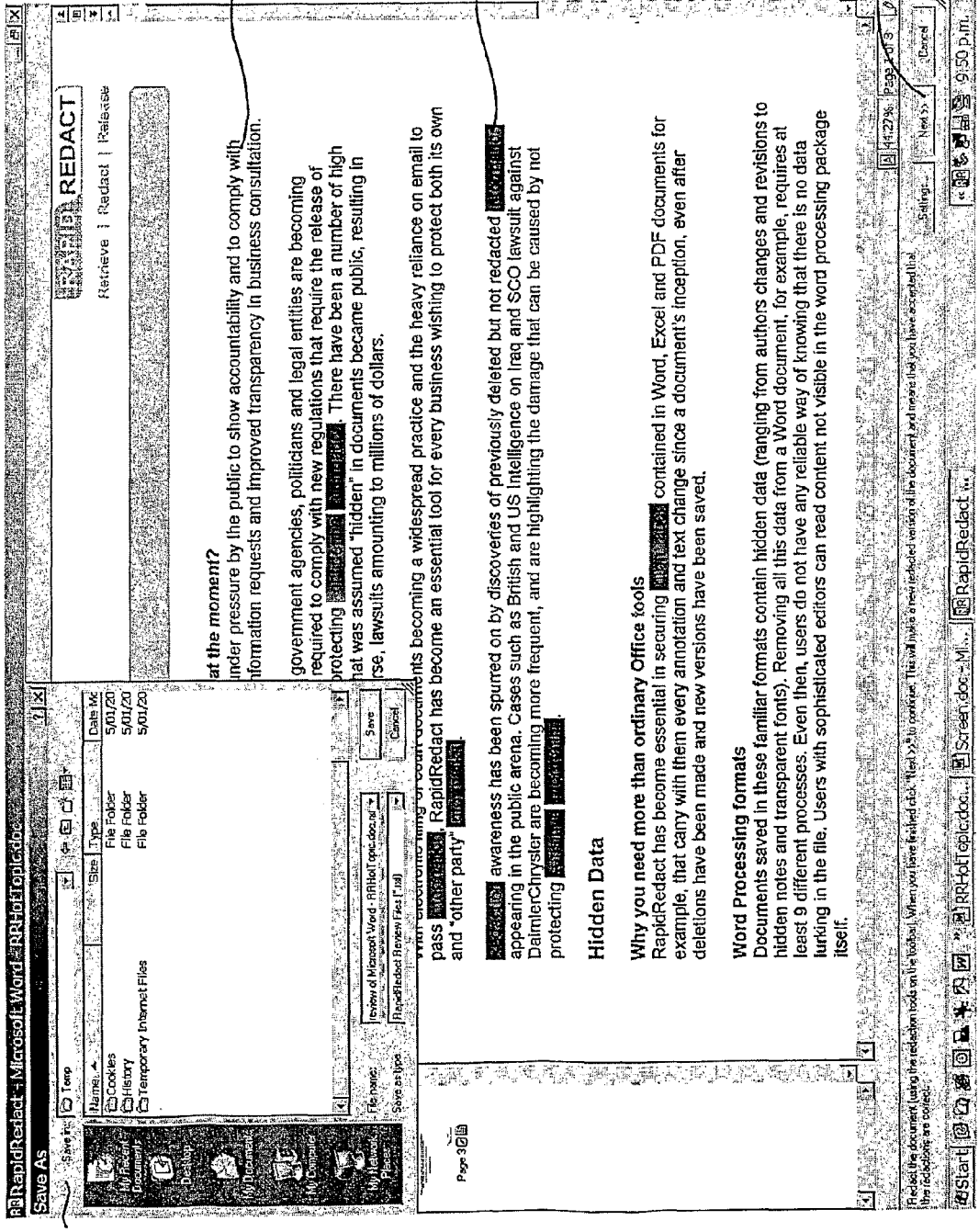
FIG. 13 is a screen shot of the redaction software's user prompt to save the review or final copy of the redacted document.

The user is then prompted by a Windows Save As dialog box 28, as illustrated in FIG. 13, to select the destination on the local computer to which the review file 14h will be saved. The user also has the option of selecting a meaningful name for the review file 14h.

It will be apparent to the skilled addressee that the review file 14h may have any alphabetic extension appended to the end of the file name, as is typical computing practice. As is described herein the review file extension is in the form MyDocument.rxf The review file is saved by the user.

To open the review file 14h and thus further redact the file, a person navigates to the location in which the review file 14h has been saved. By using a pointing device, for example a mouse, the person double clicks to open the file. The file 14h opens within the redact software 13 application window, as illustrated in FIG. 11.

The person may thus further redact the document by adding or deleting redaction markings 30 as desired.

Upon completion of redaction of the document 14h, a final version of the document 14c can be created. In this form, the translucent redaction marking 30 will be shown as solid, as illustrate in FIG. 14.

The person presses the next button 27 on the user interface. An output type dialog box 36 appears, as illustrated in FIG. 12. The output type is set to, for example, PDF 39. The ok button 38 is subsequently selected.

Figure 14:
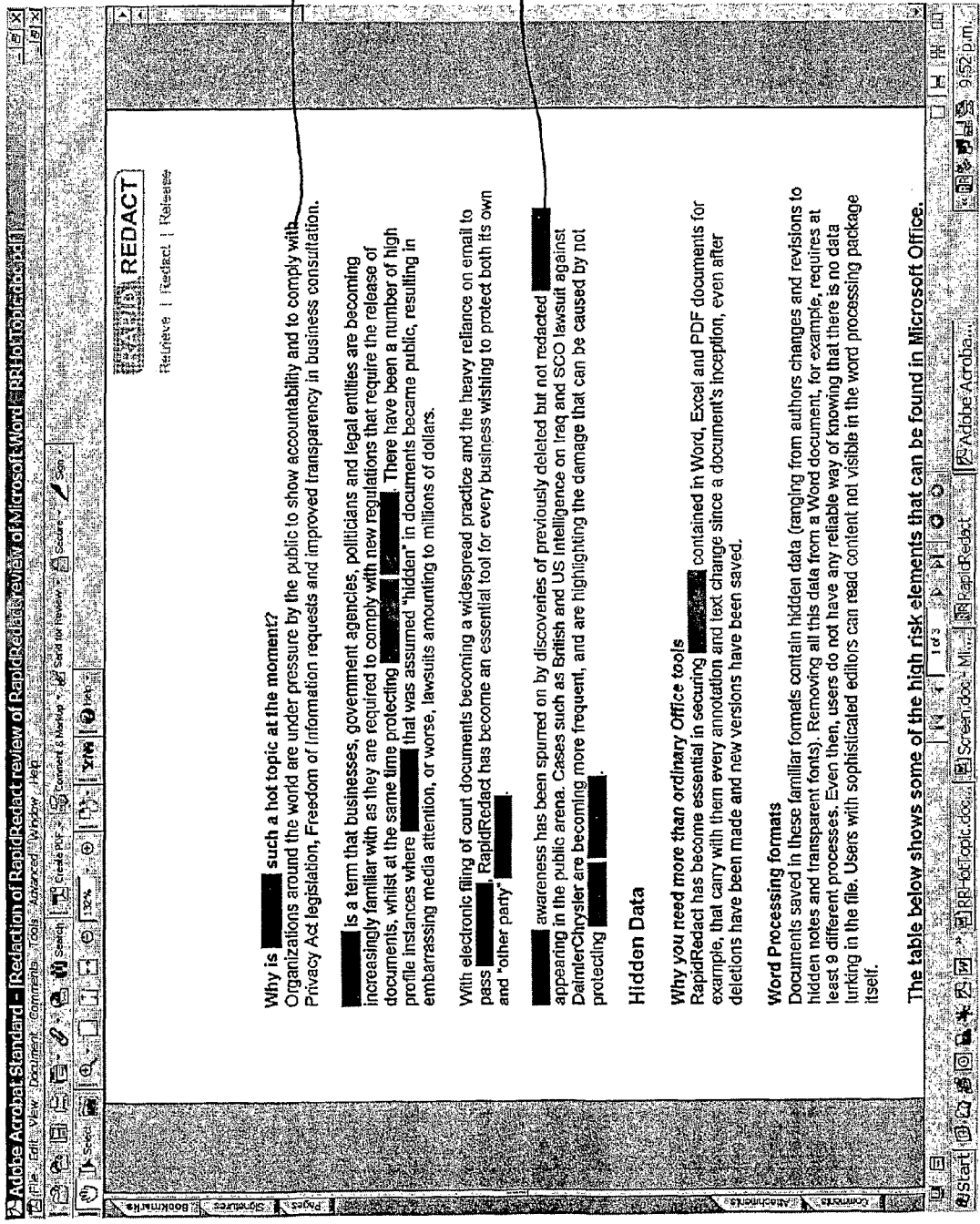
FIG. 14 is a screen shot of a final copy of the redacted document.
Figure 15:
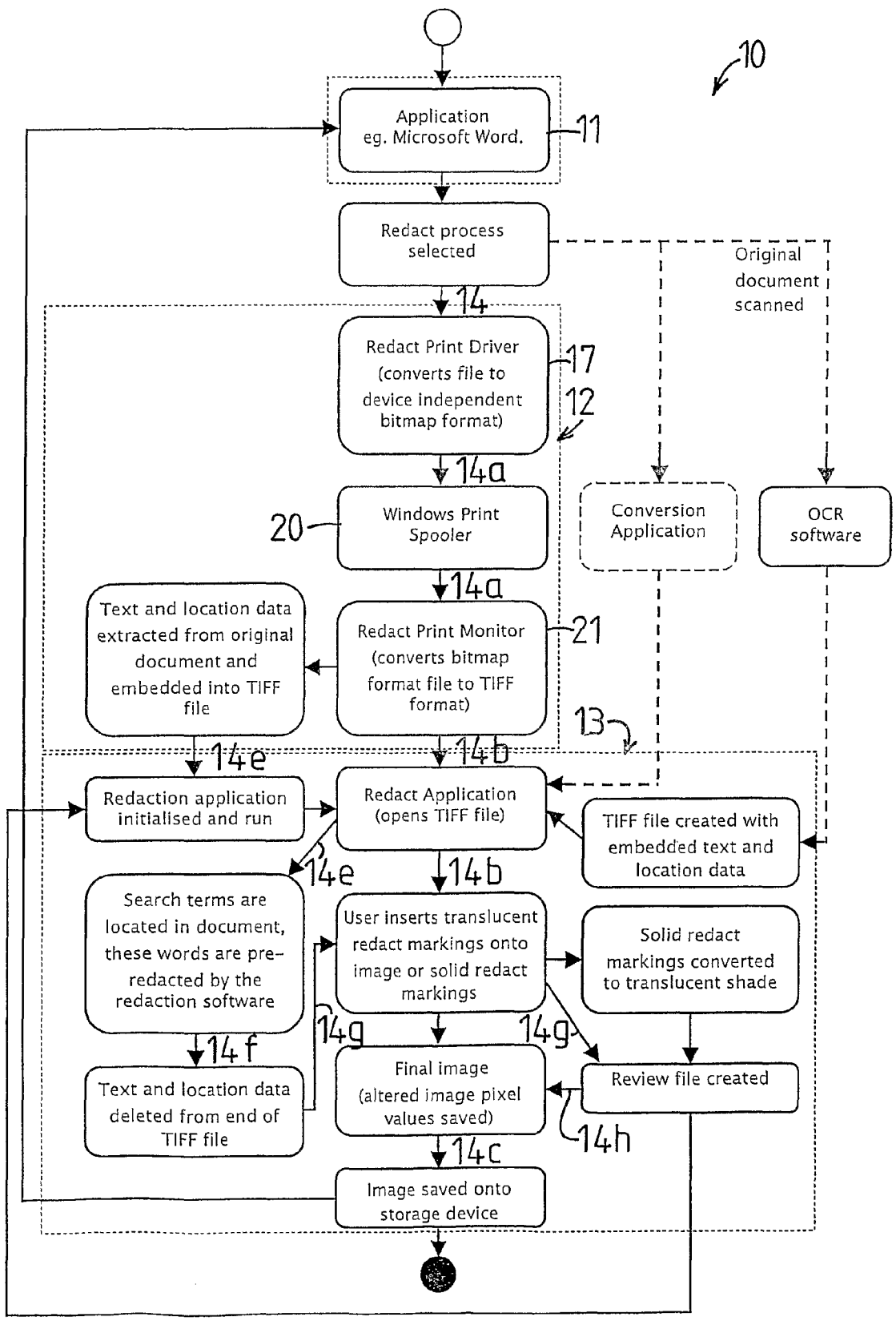
FIG. 15 is a schematic diagram of a computer system incorporating an alternative embodiment of the invention.

Upon activation of this button, the redaction application 13 makes final the image, and prompts the user to save a copy of this final image onto the storage device within their computer, by the display of a Windows save dialog box 28. The final image is illustrated in FIG. 14.

To make the redacted changes to the image permanent, the redaction application 13 saves the value of each pixel which makes up the image. Therefore, in areas within the document corresponding to translucent redaction markings, the pixels in the image relating to these section have their values changed from those representing the text and background colour, to a single value representing the redact mark.

By this process, the value of each pixel in the image is saved, thus, all trace of the pixel values in the original image, corresponding to that text which was redacted, are overwritten with a new value, thereby leaving no trace within the image of the previous pixel values.

A further option provided by the redaction software is to allow a person to generate an audit copy of the redacted document. The option on the output type dialog box 36 corresponding to create an audit copy 40 is checked, as illustrated in FIG. 12. Consequently, upon selecting the ok button 38, an audit file is created for example, as a PDF document.

An audit copy can be created at any time, and in conjunction with either a review file or final document.

The audit copy may be retained on file by the user as a record of what was redacted from the document. All redaction markings within the audit copy remain translucent, so that redacted text may be easily read.

Figure 16:
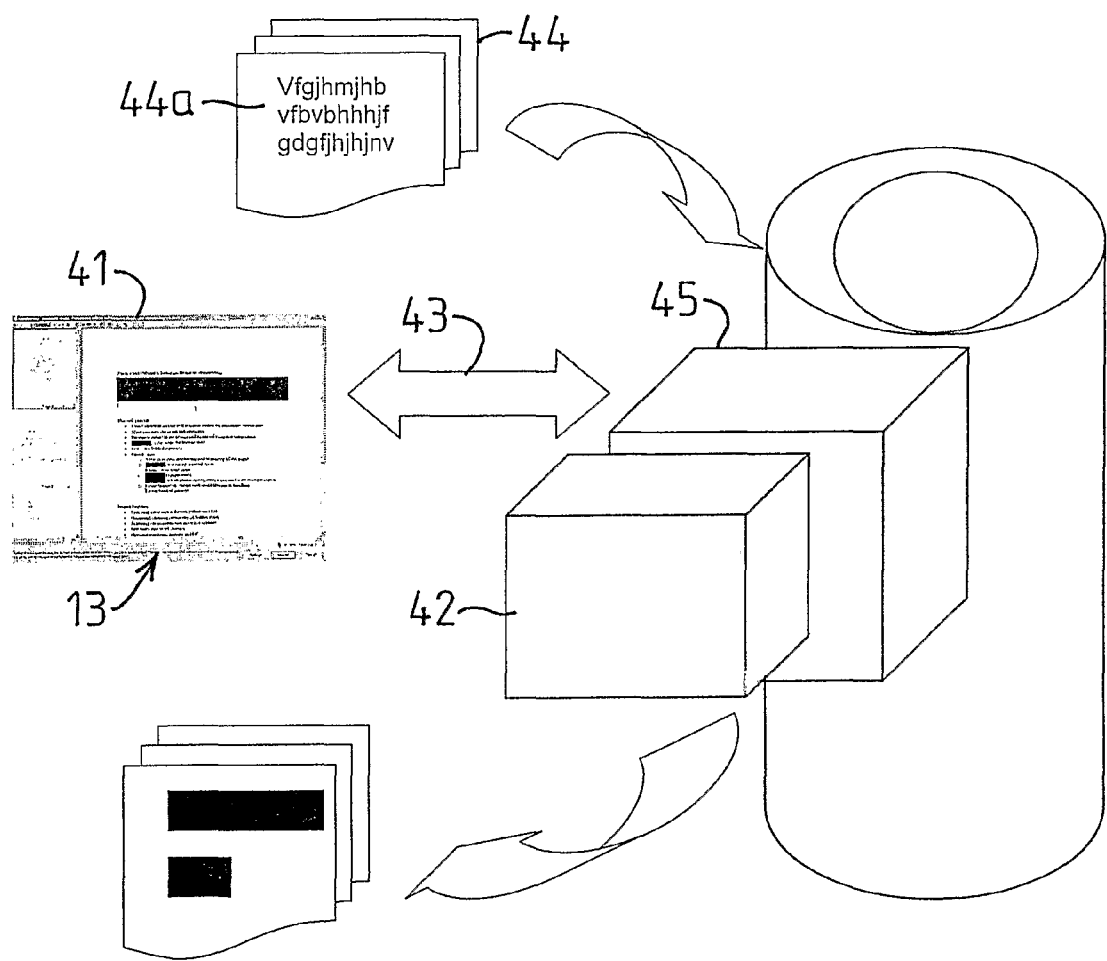
FIG. 16 is an overview of the web based implementation of the redact software application.

In a further embodiment of the invention, the redaction software 13 may be initiated within a web browser 41, and operating in conjunction with a serverside based webstreamer 42, to allow a person to efficiently redact documents accessible via the internet 43 from a remote location. An overview of this implementation is illustrated in FIG. 16.

In use, the user opens their internet browser 41, and navigates to a designated web address.

It will be apparent to the skilled addressee that the RapidRedact active x client is software that has the same functionality as the redact software 13 described above. However, as is herein described, the redact software is in the form of an active x client.

The interaction between the internet browser 41 software and the Web Server 42 software results in HTTP download of the desired RapidRedact page 44 to the user, along with the RapidRedact ActiveX client, if not already present on the user's computer. This page involves the RapidRedact client within the browser 41, passing it a reference to the document to be redacted.

The RapidRedact client parses the string that it received from the browser, and thus determines the address of the RapidRedact Webstreamer 42 that should be queried. It then sets up communications through the designated port on the Webstreamer 42 machine and bi-directional communications are established.

Once the connection is made to RapidRedact Webstreamer 42, then the RapidRedact client (running within the web browser 41 on the users computer) starts sending requests to the RapidRedact Webstreamer 42 software (on the RapidRedact Webstreamer computer 42), and receiving responses, via OTTP, where OTTP is a web streaming protocol. This protocol is similar to that of HTTP, FTP, etc, having been developed by Onstream Systems Limited.

The user logs into RapidRedact. Optionally, the RapidRedact client queries the RapidRedact Webstreamer 42 software to establish whether the user at the client computer is actually allowed access. To do this, it will transmit the string that it received from the page on the Web Server, and possibly user logon details as well. In the latter case, the user is authenticated by the RR Server via the Authentication API.

If access is granted, then the RapidRedact 45 server presents the user with their list of documents 44 to be reviewed. The RapidRedact Webstreamer 42 software determines, from the pre-configured RapidRedact Webstreamer 42 Configuration Information, which Data Provider Module is responsible for providing the documents implied by the request string.

In response to the user selection of files 44 to view, the server 45 requests the document 44 from the controlling application and opens it at the server 45. It then extracts the requested pages 44a of each document 44, and streams these to the user via the internet 43.

The user redacts the document as desired. Upon completion of the redaction process, the RapidRedact client on the users computer streams the redactions back to the server 45 which embeds them in the waiting document 44. The server 45 redacts the document 44 and supplies the appropriate output to the controlling application.

In this way, a user can remotely access and redact large numbers of documents very efficiently.

To address the issues of security where documents containing sensitive data is being transmitted via the internet, data encryption is used. This ensures that all data transmitted to and from the server is secure, and inaccessible to unauthorised persons.

The redaction software is open to modification as will be apparent to the skilled addressee.

According to an alternative embodiment, the redaction software may be written and compiled to be compatible with alternative computer operating systems that are available. For example, these may be the Linux, Solaris, or Mac OS X operating systems.

According to another embodiment, the redact print driver may be designed and written so that it may convert the original application file into a TIFF file format.

According to a further embodiment the redaction software may use an external conversion tool for converting the original application file type into an image format.

According to another embodiment, where an original document is not in electronic format, the document may be scanned by any known means, with an electronic file corresponding to the original document being created. Optical character recognition (OCR) software may be used to extract text and location data from the scanned file.

The scanned file will subsequently be converted to TIFF format, whereby the text and its location data corresponding to the original document will be embedded within the TIFF file as previously described. The TIFF file will thus be opened by the redaction software 13, whereby the electronic document may be redacted as required by a user.

According to yet another embodiment, the redaction application software may be running in the background of the computer operating system, only becoming visible when the application is required.

According to a further embodiment, the redaction markings can be of any colour as selected by the user. This can be, for example, white, black, red, etc.

The redaction process of the present invention provides the user with a useful tool for use in the redaction of documents that are saved as electronic files on a computer.

This software is very useful in that documents created in any format, so long as the application is Windows based, can be printed to the dedicated print driver, and the output file redacted by the use of the redaction application.

Another useful feature of the redaction software is that users may pre-redact documents upon conversion. In this way, a user may program into the system frequently used terms which are to be typically redacted from large numbers of documents. In this way, the redact software redacts these commonly used words without the need of the user to redact these words from each document. This therefore, goes some way to ensuring that the redaction process is efficient.

An advantage of this redaction process is that the information as redacted by the user within the document is destroyed during the redaction process, and there is no possibility of recovering the redacted data from the final redacted electronic file. This results in an electronic file that can be publicly released, and the author can be confident that the electronic file contains no hidden information consisting of, for example, revision history.

The redaction process provides a tool for allowing a person to redact a document, and also keep an exact record of the redacted document. In this form, where text etc has been marked out, the redact marking will appear in translucent form, allowing the author to easily see the information that has been removed.

The redaction process can be used by a multitude of different users, and is application independent, so long as the application contains the facility to print to the standard Windows printing system, the generated print file can be redacted.

The invention claimed is:

1. A redaction process for redaction of electronic documents, comprising:
    i. converting an electronic document file in a native electronic format into an electronic image file in an electronic image file format, the conversion process including:
       a) extracting text and text location data directly from the electronic document file, and
       b) embedding the text and text location data into the electronic image file;
    ii. after said converting step, redacting sections of the electronic image file to produce redacted image sections;
    iii. removing at least the embedded text data corresponding to the redacted image sections; and
    iv. saving the redacted electronic image file in a redacted file format.

2. The redaction process as claimed in claim 1, wherein the conversion process includes printing the electronic document file to create the electronic image file and wherein the text and text location data is extracted as part of the printing process.

3. The redaction process as claimed in claim 1,
    including searching the electronic image file for search terms using the embedded text data, and
    wherein the step of redacting sections of the electronic image file includes redacting sections located by this searching.

4. The redaction process as claimed in claim 1, wherein the conversion step utilizes a computer operating system's print spooler.

5. The redaction process as claimed in claim 1, wherein the electronic image file format is a tagged image file format.

6. The redaction process as claimed in claim 1, wherein the step of redacting sections of the electronic image file includes applying redaction markings, the redaction markings being translucent or solid markings.

7. The redaction process as claimed in claim 6, wherein the step of redacting sections of the electronic image file includes altering pixel values in the electronic image file corresponding to locations of the redaction markings from their original value to a value of the redaction markings.

8. The redaction process as claimed in claim 1, wherein the redacted file format is the TIFF or PDF format.

9. The redaction process as claimed in claim 1, wherein the saved file in the redacted file format includes redaction markings that cannot be further edited by a user.

10. The redaction process as claimed in claim 1, including, before saving the redacted electronic image file in the redacted file format, saving a redaction review file including redaction markings that can be edited at a later time by a user.

11. The redaction process as claimed in claim 1, including saving an audit copy of the redacted electronic image file, the audit copy indicating the redactions that have been made but allowing the redacted text to be read.

12. A computer programmed to implement a redaction process for redaction of electronic documents, the redaction process including:
    i. converting an electronic document file in a native electronic format into an electronic image file in an electronic image file format, the conversion process including:
       a) extracting text and text location data directly from the electronic document file, and
       b) embedding the text and text location data into the electronic image file;
    ii. after said converting step, redacting sections of the electronic image file to produce redacted image sections;
    iii. removing at least the embedded text data corresponding to the redacted image sections; and
    iv. saving the redacted electronic image file in a redacted file format.

13. The computer programmed to implement a redaction process for redaction of electronic documents, as claimed in claim 12, the computer further programmed to perform a redaction process including:
    v. receiving a scanned electronic image file holding a scanned electronic version of a document in an electronic image file format;
    vi. performing an optical character recognition process on the scanned electronic image file, thereby creating electronic text data;
    vii. embedding the created text data into the scanned electronic image file; and
    viii. performing steps ii) to iv) on the scanned electronic image file.

14. The computer programmed to implement a redaction process for redaction of electronic documents, as claimed in claim 12, wherein the computer software includes an application software component, a document conversion component, and a redaction software component.

15. The computer programmed to implement a redaction process for redaction of electronic documents, as claimed in claim 12, wherein the document conversion component includes a redact print driver, redact print monitor, and utilizes a computer operating system's print spooler.

16. The computer programmed to implement a redaction process for redaction of electronic documents, as claimed in claim 12, wherein the conversion process includes printing the electronic document file to create the electronic image file and wherein the text and text location data is extracted as part of the printing process.

17. The computer programmed to implement a redaction process for redaction of electronic documents, as claimed in claim 12, further including searching the electronic image file for search terms using the embedded text data, and wherein the step of redacting sections of the electronic image file includes redacting sections located by this searching.

18. The computer programmed to implement a redaction process for redaction of electronic documents, as claimed in claim 12, wherein the electronic image file format is a tagged image file format.

19. The computer programmed to implement a redaction process for redaction of electronic documents, as claimed in claim 12 wherein the step of redacting sections of the electronic image file includes applying redaction markings, the redaction markings being translucent or solid markings.

20. The computer programmed to implement a redaction process for redaction of electronic documents, as claimed in claim 19, wherein the step of redacting sections of the electronic image file includes altering pixel values in the electronic image file corresponding to locations of the redaction markings from their original value to a value of the redaction markings.

21. The computer programmed to implement a redaction process for redaction of electronic documents, as claimed in claim 12, wherein the redacted file format is the PDF format.

22. The computer programmed to implement a redaction process for redaction of electronic documents, as claimed in claim 12, wherein the saved file in the redacted file format is an electronic image file including redaction markings that cannot be further edited by a user.

23. The computer programmed to implement a redaction process for redaction of electronic documents, as claimed in claim 12, including, before saving the redacted electronic image file in a redacted file format, saving a redaction review file including redaction markings that can be edited at a later time by a user.

24. The computer programmed to implement a redaction process for redaction of electronic documents, as claimed in claim 12, including saving an audit copy of the redacted electronic image file, the audit copy indicating the redactions that have been made but allowing the redacted text to be read.

* * * * *

UNITED STATES PATENT AND TRADEMARK OFFICE
CERTIFICATE OF CORRECTION

PATENT NO. : 8,456,654 B2  Page 1 of 1
APPLICATION NO. : 11/665448
DATED : June 4, 2013
INVENTOR(S) : Kelly et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1665 days.

Signed and Sealed this
Eighth Day of September, 2015

Michelle K. Lee
*Director of the United States Patent and Trademark Office*